Jan. 15, 1952   P. PAREN   2,582,792
PROCESS FOR TREATING WASTE LIQUOR FROM PAPER
Filed Dec. 2, 1946
Fig. 1
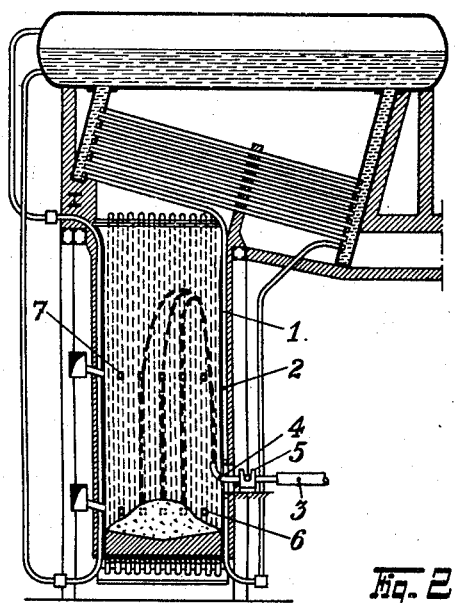
Fig. 2
Fig. 3
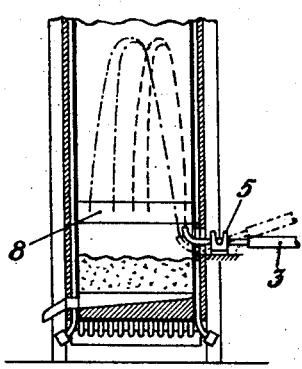
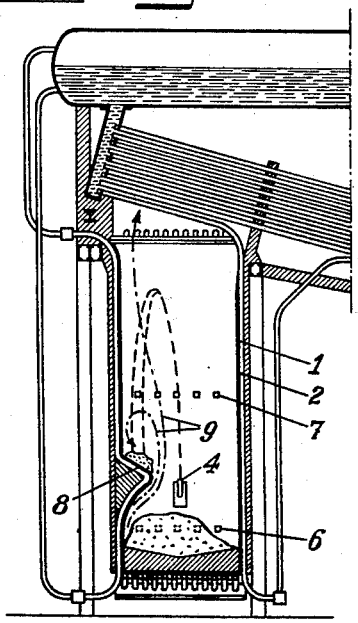
Inventor
Per Paren
by Sommers·Young
Attorneys Patented Jan. 15, 1952

2,582,792

UNITED STATES PATENT OFFICE 2,582,792

PROCESS FOR TREATING WASTE LIQUOR FROM PAPER

Per Paren, Jonkoping, Sweden, assignor to Jonkopings Mekaniska Werkstads Aktiebolag, Jonkoping, Sweden, a Swedish joint-stock company Application December 2, 1946, Serial No. 713,493
In Sweden July 9, 1946

1 Claim. (Cl. 23—48)

This invention relates to a process and a device for introducing black or waste liquor from paper pulp mills into the furnace walls, for combustion of the combustible components of the liquor and for recovery of heat and the chemicals contained in said liquor. Residual liquors of this kind containing combustible materials and inorganic chemicals are especially obtained from the soda process. The liquor, which contains combustible materials and inorganic chemicals, may be previously concentrated to a certain degree and is completely evaporated in the furnace and burnt for the recovery of the chemicals contained in the liquor, whereby the heat from the combustion is sufficient for the evaporation and for generating of steam in a boiler.

One object of my invention is an improved process for introducing the liquor in the furnace in such a way that the liquor does not reach the walls or bottom of the furnace before being evaporated to a dry or nearly dry consistency.

A further object of the invention is to cause the injected liquor to follow a sufficient long path of travel in the combustion room so as to permit a sufficient evaporation of water.

Another object of my invention is to avoid coking and insulation of the wall of the furnace by spraying liquor over a considerable part thereof and to enable the heat from the furnace more unimpededly to reach heat absorbing tubes mounted in said walls. Thereby the total wall area of the furnace can be reduced in relation to the type of furnaces heretofore used, in which the liquor is sprayed transversely of the vertical furnace and forms an insulating layer of only partly evaporated residues on the furnace wall opposite to the spraying nozzle.

Another object of the invention is to protect the furnace walls from chemical corrosion by the recovered and melted chemicals.

Other objects of the invention will appear from the following description and the accompanying drawings, in which Fig. 1 is a vertical section through one embodiment of a boiler with a furnace for the evaporation and combustion of pulp residual liquor according to the invention.

Fig. 2 is a vertical section through a part of a boiler for the combustion of residual liquor according to another embodiment of the invention.

Fig. 3 is a vertical section of the embodiment illustrated in Fig. 2 but taken at right angle to the section of Fig. 2.

In the different drawings corresponding parts are designated with the same reference numbers.

In the embodiments shown, the walls of the furnace are covered on the inside with a layer of cast iron plates 1, which protect rows of heat absorbing water or steam tubes 2 disposed in the walls of the furnace. The liquor which may be previously partly evaporated is pressed by means of a pump not shown on the drawing through a flexible hose or pipe 3 to a nozzle 4 extending inwardly through an opening in the wall of the furnace. The nozzle has its outlet turned upwards, and the liquor is ejected from the nozzle with a pressure permitting the liquor to ascend to the upper part of the furnace so as after reaching the culmination point to fall down towards the bottom. The nozzle may be provided with a spraying plate or be accordingly formed for obtaining a certain dispersion of the jet of liquor. The nozzle 4 is supported by two diametrically opposed pinions, which are journalled in forked bearings 5 and permit the nozzle to be oscillated by any appropriate mechanical means. Thereby the evaporated material can be distributed over the bottom of the furnace. The liquor particles are maintained in suspension in the stream of upwardly ascending combustion gases during a considerable period of time owing to the retardation of the liquor in the rising part of the path and the resistance of the hot gas stream to the falling movement. Sufficient time is thus obtained for the particles of the liquor to be evaporated to total or nearly total dryness before reaching the bottom of the furnace. The walls are thereby kept substantially free from wet particles, and dry particles striking the walls fall instantly down to the bottom. Near the bottom of the furnace are provided a number of primary air inlet openings 6 for a reducing combustion of the dry residues accumulated at the bottom of the furnace, and secondary air inlets 7 are arranged at a suitable distance above the primary air inlets 6.

In the embodiment shown in Figs. 2 and 3 the nozzle 4 is so directed that the major part of the downwards falling particles of the liquor fall onto a sloping surface 8 of one of the side walls of the furnace, on which they are finally dried and from which they from time to time fall down on the bottom of the furnace in the form of dry lumps. As the nozzle 4 is rockingly supported in a bearing 5 the mass can be more uniformly distributed over the oblique surface 8 as will be clearly understood from Fig. 2. The furnace wall below the surface 8 forms an upwards and inwards directed surface for guiding the ascending combustion gases away from the space above the surface 8. The hereby obtained flow of the gases is indicated by the mixed lines 9. Oblique surfaces 8 of the kind described above may also be arranged on other walls of the furnace and can receive the liquor from a single common nozzle appropriately guided or from different nozzles. The surface 8 serves as a screen for the pocket formed above the same so that the upwardly directed stream of gases obtain a reduced speed in said pocket, and owing to turbulences in the gas stream also a flow of gases directed downwardly against the surface 8 may be obtained. Thereby the deposit of minor particles on the oblique surface is facilitated, so that they are prevented from following the gas stream out of the furnace. When the layer of the evaporated mass on the oblique surface has attained a certain thickness, it falls down to the bottom of the furnace where it is finally burnt. Although the oblique furnace thus is covered by a layer of the more or less evaporated mass, this will reduce the heat absorption in much less degree than if the fluid is sprayed over the vertical side walls.

Instead of primary air inlets in the side walls of the furnace these inlets may be provided as air nozzles passing through the bottom of the furnace. Further it is possible to dispose the liquor injecting nozzle in the interior of the furnace at some distance from its bottom and to lead the pressure pipe to the nozzle through said bottom. It is obvious, however, that also other modifications are possible within the scope of the invention.

I claim:

A process for treating waste liquor from paper pulpmills for combustion of organic substances and recovery of inorganic chemicals contained in said waste liquor comprising injecting said waste liquor into the furnace of a boiler with water cooled furnace walls as a jet directed upwards in such a direction and to such a height that the free particles of the waste liquor on their way first upwards to a culmination point, located in the path of the rising gases of combustion and thereafter downwards are at least substantially dried by hot gases in the furnace produced by the combustion of said organic substances and that the major part of said particles on their way downwards fall freely down onto a surface sloping downwards into the furnace, which surface forms a portion of the furnace inner wall situated just above the bottom of the furnace from which surface they fall down in the form of lumps onto the bottom of the furnace, burning dried residues on the bottom of the furnace by a reducing combustion by air from primary inlets at a short distance above said bottom for recovery of chemicals, injecting secondary air at a higher level than the primary air, and passing the hot gases out of said furnace to heat-absorbing tubes of the boiler.

PER PAREN.

REFERENCES CITED

The following references are of record in the file of this patent:

UNITED STATES PATENTS

| Number | Name | Date |
| --- | --- | --- |
| 478,980 | Blackman | July 19, 1892 |
| 1,137,780 | Moore | May 4, 1915 |
| 1,326,414 | Moore et al. | Dec. 30, 1919 |
| 1,444,833 | Haner | Feb. 13, 1923 |
| 2,050,400 | Wagner | Aug. 11, 1936 |
| 2,161,110 | Tomlinson et al. | June 6, 1939 |
| 2,242,653 | Maxwell | May 20, 1941 |
| 2,258,467 | Owens | Oct. 7, 1941 |